US00RE42563E

(19) United States
(12) Reissued Patent
Kasai et al.

(10) Patent Number: US RE42,563 E
(45) Date of Reissued Patent: Jul. 19, 2011

(54) FINE POLYMER PARTICLES FOR PLASTISOL, PROCESS FOR PRODUCING THE SAME, AND HALOGEN-FREE PLASTISOL COMPOSITION AND ARTICLE MADE WITH THE SAME

(75) Inventors: Toshihiro Kasai, Otake (JP); Toru Tsuchihashi, Shizuoka (JP)

(73) Assignee: Mitsubishi Rayon Co., Ltd., Tokyo (JP)

(21) Appl. No.: 11/727,416

(22) PCT Filed: Sep. 20, 2000

(86) PCT No.: PCT/JP00/06408

§ 371 (c)(1),
(2), (4) Date: Nov. 19, 2001

(87) PCT Pub. No.: WO01/21707

PCT Pub. Date: Mar. 29, 2001

Related U.S. Patent Documents

Reissue of:
(64) Patent No.: 6,894,108
Issued: May 17, 2005
Appl. No.: 09/926,557
Filed: Nov. 19, 2001

(30) Foreign Application Priority Data

Sep. 20, 1999 (JP) ..... 11/265280
Sep. 24, 1999 (JP) ..... 11/269936

(51) Int. Cl.
*C08K 3/00* (2006.01)

(52) U.S. Cl. ..... 524/556; 523/201; 524/560; 524/561; 524/562; 524/563

(58) Field of Classification Search ..... 524/556, 524/560, 561, 562, 563, 569; 523/201
See application file for complete search history.

(56) References Cited

U.S. PATENT DOCUMENTS 6,140,002 A * 10/2000 Shimizu et al. ..... 430/109.3
6,433,048 B2 * 8/2002 Kasai ..... 524/244

FOREIGN PATENT DOCUMENTS

| | | | |
|---|---|---|---|
| DE | 4034725 | * | 5/1992 |
| EP | 0448305 | * | 9/1991 |
| EP | 0533026 | * | 3/1993 |
| EP | 0539031 | * | 4/1993 |
| EP | 0612788 | * | 8/1994 |
| EP | 0624606 | * | 11/1994 |
| EP | 0637601 | * | 2/1995 |
| EP | 0894828 | * | 2/1999 |
| EP | 1027974 | * | 8/2000 |
| JP | 63-89555 | | 4/1988 |
| JP | 6-502209 | | 3/1994 |
| JP | 10-231409 | * | 9/1998 |
| JP | 11-35784 | * | 2/1999 |
| JP | 11-124483 | * | 5/1999 |
| JP | 11-217479 | * | 8/1999 |
| JP | 2000-281857 | * | 10/2000 |
| WO | WO95/15994 | * | 6/1995 |
| WO | WO 98/29507 | | 7/1998 |
| WO | WO99/21692 | * | 5/1999 |

OTHER PUBLICATIONS

Prosecution Documents from Japanese Patent Application 2001-525274 (Notice of the Reasons of Rejection).
Prosecution Documents from Japanese Patent Application 2001-525274 (Remarks).
Prosecution Documents from Japanese Patent Application 2001-525274 (Amendments).
"Third Party Observations" filed in counterpart European Application 00961107.0—containing statements regarding EP 0951507B1.

* cited by examiner

*Primary Examiner* — Edward J Cain
(74) *Attorney, Agent, or Firm* — Oblon, Spivak, McClelland, Maier & Neustadt, L.L.P.

(57) ABSTRACT

This invention relates to a fine particle of polymer for a plastisol free from halogen atoms and having a specific surface area of 0.6 to 20.0 $m^2/g$ as determined by nitrogen-gas adsorption and a non-halogenated plastisol composition therefrom. This invention can provide a non-halogenated plastisol composition which does not generate toxic substances during incineration, is suitable as a coating material or sealant, and has a low viscosity, resulting in good workability and processability.

15 Claims, No Drawings

FINE POLYMER PARTICLES FOR PLASTISOL, PROCESS FOR PRODUCING THE SAME, AND HALOGEN-FREE PLASTISOL COMPOSITION AND ARTICLE MADE WITH THE SAME

Matter enclosed in heavy brackets [ ] appears in the original patent but forms no part of this reissue specification; matter printed in italics indicates the additions made by reissue.

TECHNICAL FIELD

This invention relates to a fine particle of polymer which allows a non-halogenated plastisol to be prepared with a small amount of a plasticizer and a manufacturing process therefor, as well as a non-halogenated plastisol composition and an article produced therefrom. This invention also relates to a non-halogenated plastisol composition having viscosity properties for good workability, exhibiting good suitability to processing into an airless spray and suitable as a coating or sealing material.

BACKGROUND ART

A plastisol in which a fine particle of polymer is dispersed in a plasticizer as a medium has been utilized in a variety of industrial applications, but a vinyl-chloride plastisol (hereinafter, referred to as "PVC sol") using a polyvinyl chloride is used in most of these applications. Owing to their good processability and physical properties, PVC sols have been used in a wide variety of applications such as wallpapers, undercoats for an automobile, body sealers for an automobile, carpet backing materials, floor materials, paints and toys, and thus industrially carries significant value.

Besides many properties such as strength after curing by heating, elongation, rubber elasticity, flexibility, low-temperature properties and damping, a PVC sol exhibits good workability in a sol state before curing by heating and good processability.

"Good workability" as used herein means that a relatively smaller amount of a plasticizer may be combined to a fine particle of polymer and that a resulting sol has a lower viscosity so that it may be easily introduced in a variety of processing lines. In other words, to a certain amount of a plasticizer, a larger amount of an inorganic filler may be added. Such a plastisol which can be formed with a small amount of a plasticizer permits freedom in compounding, may be easily introduced in a processing line and can be widely applied regardless to an application.

The fact that a small amount of a plasticizer may be combined with a fine particle of polymer considerably contributes for improving not only workability but also physical properties of a molding. For example, a smaller amount of a plasticizer in a molding may prevent bleed-out of the plasticizer with time and may improve strength or an elastic modulus of a molding.

However, a PVC sol or an article prepared therefrom generates hydrogen chloride gas during incineration, which is believed to cause problems in relation to the environment and an incinerator such as considerable damage to the incinerator and acid rain due to hydrogen chloride gas discharged to the air. More recently, the gas has been believed to be one of causes generating extremely poisonous substances such as dioxins. There has been, therefore, needs for developing an alternative material because of strong concern about adverse affect to a human body or the global environment.

Such environmental problems are associated with not only a PVC sol but also a plastisol using a halogen-containing polymer in general. It has been, therefore, desired to develop a plastisol using a polymer without halogen atoms, i.e., a non-halogenated plastisol. As one candidate, an acrylic plastisol using an acrylic polymer (generally called an "acrylic sol") has been proposed.

There have been proposed procedures for reducing the content of chlorine atoms in order to solve the above problems in a PVC sol. For example, JP-As 60-258241, 61-185518 and 61-207418 have proposed an attempt that a complex is formed from vinyl chloride and another polymer material such as an acrylic polymer to provide a plastisol with a reduced chlorine content.

Although the halogen content is reduced in such a plastisol, it still contains halogen atoms. Thus, the problem of generation of hydrogen chloride gas or dioxins during incineration has not been essentially solved.

JP-As 7-233299 and 8-295850 have proposed a plastisol using a particulate acrylic polymer, i.e, an acrylic sol as a non-halogenated plastisol with no halogen atoms.

Generally an acrylic sol has a quite similar appearance to a PVC sol, but the former has considerably different properties of a fine particle of polymer and therefore quite different workability or processability. For example, even when an acrylic sol and a PVC sol are prepared as a fine particle of polymer having the same particle size and size distribution, they exhibits considerably different viscosity, thixotropic properties and leveling properties. Therefore, in developing an acrylic sol or an article therefrom, an acrylic sol with desired properties cannot be obtained when employing known technique and information for a PVC sol as such.

These publications have disclosed an acrylic sol just for proposing a non-halogenated plastisol as an alternative material to a PVC sol. Its workability is significantly lower than that for a PVC sol.

For example, in the acrylic sol described in the publications, the lower limit of a plasticizer required for solation is considerably higher and a resulting plastisol has a higher viscosity so that it cannot be easily introduced in an existing processing line, i.e, reduced workability; a molding cannot be quickly formed in a short period; and a resulting article exhibits lower strength, i.e., reduced processability. A relatively higher amount of a plasticizer may leads to its bleed-out with time from the resulting article. Furthermore, a sol viscosity increases at a higher rate so that the sol has a shorter shelf life and a shorter working life.

In terms of workability in spray coating using, for example, an airless spray, an acrylic sol proposed in the previous publications cannot provide viscosity properties required for spray coating. In particular, it cannot be used for an application involving an airless-spray coating such as an undercoat or body sealer for an automobile.

For example, JP-A 8-3411 has described that an acrylic sol disclosed therein can provide a low-viscosity sol whereby uneven coating may be prevented. It, however, has a too high viscosity to be used in an airless spray. When adding a large amount of a plasticizer for reducing a viscosity, a coated sol may generate sagging so that an adequate film thickness or coating pattern cannot be maintained. When a reduced amount of a plasticizer is added to increase a viscosity for avoiding sagging, sagging can be prevented while airless-spray coating itself cannot be conducted due to an excessively higher viscosity. Thus, the prior art has not provided an acrylic sol having viscosity properties required for airless-spray coating.

There have been no descriptions of a non-halogenated plastisol without halogen atoms which generate toxic materials such as hydrogen chloride and dioxins during incineration and exhibiting good workability and processability.

DISCLOSURE OF THE INVENTION

An objective of this invention is to provide a fine particle of polymer whereby a non-halogenated plastisol can be prepared with adding a small amount of a plasticizer, a non-halogenated plastisol composition using the particles, and an article prepared using the particles. Another objective of this invention is to provide a non-halogenated plastisol composition with viscosity properties giving good workability, having good processing suitability to an airless spray and suitable to a coating or sealing material.

This invention relates to a fine particle of polymer for a plastisol free from halogen atoms and having a specific surface area of 0.6 to 20.0 $m^2/g$ as determined by nitrogen-gas adsorption.

This invention also relates to a process for manufacturing a fine particle of polymer for the above plastisol, comprising the steps of preparing an aqueous dispersion of a fine particle of polymer in which primary particles have an average particle size of at least 500 nm; drying the aqueous dispersion at not lower than 50° C. but not higher than [a glass-transition temperature of the polymer +20]° C., by spray drying.

This invention also relates to a non-halogenated plastisol composition containing the above fine particle of polymer for a plastisol and a plasticizer.

This invention also relates to a non-halogenated plastisol composition comprising the above particulate acrylic polymer for a plastisol consisting of agglomerates formed from a plurality of primary particles in which the primary particles have an average particle size of at least 500 nm; a plasticizer; and an organic filler.

This invention also relates to a coating material consisting of the above plastisol composition.

This invention also relates to a sealant consisting of the above plastisol composition.

This invention also relates to an article produced using the plastisol composition.

A fine particle of polymer for a plastisol of this invention, a non-halogenated plastisol composition using the particles and an article therefrom do not generate toxic substances such as hydrogen chloride gas and dioxins during incineration because they doe not contain halogen atoms.

According to this invention, a non-halogenated plastisol composition with lower viscosity exhibiting good workability and processability can be provided by adding only a small amount of a plasticizer. In particular, this invention may provide a non-halogenated plastisol composition exhibiting good processing suitability into an airless spray and suitable as a coating material or sealant.

Thus, this invention carries remarkable industrial significance and considerably effects on global environmental protection.

BEST MODE FOR CARRYING OUT THE INVENTION

We have intensely attempted to achieve the above objectives and have finally found that it is necessary to control a specific surface area of a fine particle of polymer used within a particular range for providing a plastisol which can be compounded with a small amount of a plasticizer, i.e., good workability, and can rapidly provide a molding by heating for a short time, i.e,. good processability.

Specifically, we have found that compared with polyvinylchloride particles used in a PVC sol, a conventional particulate acrylic polymer used in an acrylic sol may be characterized in that i) they have a large area contacting with a plasticizer due to their excessively large specific surface area, ii) on the contrary, they have a small area contacting with a plasticized due to their excessively small specific surface area, or iii) they absorb a large amount of oil so that most of a plasticizer may be absorbed in the fine particle of polymer, and that these properties cause the problems in workability and processability.

Then, we have investigated the problems and have found that a particulate non-halogenated polymer having a specific surface area of 0.6 to 20.0 $m^2/g$ as determined by nitrogen-gas adsorption can be used to provide non-halogenated plastisol composition with good workability and processability, resulting in this invention.

In terms of processing suitability to spray coating such as an airless spray, we have found that viscosity properties of a sol, i.e., a high-shear viscosity and a low-shear viscosity, may be adjusted to a particular range to achieve good suitability, resulting in this invention. This invention will be described in detail.

Although an acrylic sol as one of non-halogenated plastisols have the same appearance as a PVC sol, i.e., it is a sol in which a fine particle of polymer is dispersed in an organic medium (a plasticizer), the acrylic sol employs resins exhibiting essentially different properties as a fine particle of polymer. Thus, when the prior art for a PVC sol is simply applied to an acrylic sol, some properties such as viscosity properties becomes quite different so that good properties in workability and processability cannot be obtained as in a conventional manner.

Specifically, for a PVC sol there is strong intermolecular cohesive force in a fine particle of polymer so that it exhibits good storage stability in the presence of a plasticizer irrespective of a polymer particle size or molecular weight, while for an acrylic sol, there is not such strong intermolecular cohesive force so that storage stability is usually lower in the presence of a plasticizer.

Wettability to a plasticizer is different between a PVC sol and an acrylic sol, so that they exhibit significantly different dispersion in the plasticizer, i.e., showing quite different viscosity behavior of a sol. For example, in order to reduce a sol viscosity, a known technique of adding a viscosity-reducing agent such as an emulsifier or dispersant may be used for a PVC sol, whereas such a technique may not be necessarily effective for an acrylic sol. Furthermore, for a particle size distribution for a fine particle of polymer, a particle size distribution most optimal to a PVC sol may not necessarily provide similar properties when applied to an acrylic sol.

As described above, it is difficult to achieve desired properties by simply applying techniques for a PVC sol to a non-halogenated plastisol. For providing a non-halogenated plastisol having desired properties, it is thus necessary to employ the following particular configuration.

A fine particle of polymer for a plastisol of this invention must be comprised of a non-halogenated polymer containing no halogen atoms for avoiding generation of toxic substances derived from halogen atoms such as hydrogen chloride and dioxins. A preferred non-halogenated polymer is an acrylic polymer. An acrylic polymer has advantages that i) a polymer having a desired higher polymerization degree can be easily obtained by radical polymerization, ii) fine particles can be easily obtained by a technique such as emulsion polymerization and suspension polymerization, iii) a polymerization composition can be easily optimized because a monomer can be selected from a wide variety of co-polymerization monomers, and iv) reactivity or properties such as adhesiveness to a base material can be easily endowed because a variety of functional groups may be introduced in a polymer.

A fine particle of polymer for a plastisol of this invention must have a specific surface area of 0.6 to 20.0 $m^2/g$ as determined by nitrogen gas adsorption.

The amount of a plasticizer for providing a plastisol may depend on many factors, but in particular, a contact area of a fine particle of polymer with a plasticizer, i.e., a specific surface area of a fine particle of polymer, is most significant.

In contrast with a polyvinyl chloride having strong intermolecular cohesive force, a non-halogenated polymer, in particular, an acrylic polymer, gradually swells by absorbing a plasticizer with time so that a viscosity of a plastisol gradually increases, leading to reduction in storage stability in a remarkable case. Furthermore, an absorption rate for a plasticizer depends on compatibility between a polymer and a plasticizer. These are influenced by a contact area of a fine particle of polymer with a plasticizer. In other words, it is necessary for reducing an absorption rate for a plasticizer that a specific surface area of a fine particle of polymer is small.

On the other hand, it is desired for processability when a plastisol is cured by heating that a polymer swells and is dissolved by rapidly absorbing a plasticizer by heating for a short period. In this respect, it is necessary that a contact area with a plasticizer, i.e., a specific surface area is large.

As described above, a specific surface area of a fine particle of polymer significantly influences workability related to the amount of a plasticizer and storage stability and processability, i.e., curing by heating for a short period. It is, therefore, necessary to control a specific surface area of a fine particle of polymer to 0.6 to 20.0 $m^2/g$.

Controlling a specific surface area of a fine particle of polymer to 0.6 to 20.0 $m^2/g$ allows workability or processability to be improved even when using a non-halogenated polymer with a relatively weak intermolecular cohesive force.

A specific surface area of a fine particle of polymer exceeding 20.0 $m^2/g$ may make an absorption rate of a plasticizer so high that the polymer may considerably swell in a short time. Although it is preferable in that a process of curing by heating can be short, it may result in problems that a large amount of a plasticizer is required for compounding so that the system becomes of a higher viscosity and that a viscosity-increasing rate of a plastisol composition with time may be so high that a working life is reduced, leading to reduction in workability.

When a specific surface area of a fine particle of polymer is less than 0.6 $m^2/g$, a contact area with a plasticizer becomes so small that a plasticizer-absorption rate of a fine particle of polymer is significantly reduced during a process of curing by heating. Thus, gelling or molding cannot adequately proceed by heating for a short time so that a strong molding cannot be obtained, leading to reduction in processability.

In this invention, a more preferable range of a specific surface area of a fine particle of polymer is 1.0 to 10.0 $m^2/g$. A specific surface area within this range may provide advantages that a very small amount of a plasticizer may be adequate for compounding and that a resulting plastisol may exhibit a significantly reduced viscosity, while it may allow satisfactory molding to be performed in a short period during a process of curing by heating and may provide a plastisol composition with desired properties.

As described above, a specific surface area of a fine particle of polymer is one of significant factors for obtaining desired properties for a plastisol. An oil absorption rate of a fine particle of polymer is also an important factor. Specifically, when adding a certain amount of a plasticizer is added to fine particles of polymer with different oil absorption rates, a fine particle of polymer with a lower oil absorption rate may provide a plastisol with a lower viscosity.

We have thus investigated a suitable range of an oil absorption rate for a fine particle of polymer for a plastisol and have found that as determined for linseed oil, a preferable range of an oil absorption rate is up to 0.8 mL/g (cc/g). Using a fine particle of polymer having an oil absorption rate within this range, a viscosity can be considerably reduced in comparison with a conventionally proposed acrylic plastisol, resulting in good workability irrespective of an application.

A specific surface area and an oil absorption rate are apparently, but not actually, correlated with a particle size of a fine particle of polymer. For a non-halogenated plastisol proposed in previous publications, there have been many proposals in which a particle size of a fine particle of polymer is restricted, but we have found after investigation that restriction to a particle size cannot always improve workability or processability.

A fine particle of polymer used in a plastisol has a form of two- or more dimensional agglomerates of many primary polymer particles. Therefore, even particles with an equal particle size may exhibit a significantly different specific surface area or oil absorption rate. In other words, there is not correlation between a particle size and a specific surface area and thus simply defining a particle size as in previous proposals cannot essentially solve the problems. In fact, even when using a preferable polymer particle size proposed in the previous publications, a plastisol with an adequately low viscosity cannot be sometimes provided. In contrast, according to this invention using a fine particle of polymer with a particular specific surface area, a plastisol composition with a lower viscosity can be provided.

Among factors determining an aggregation state of primary particles in an agglomeration structure of a fine particle of polymer, a particularly influential factor is a drying temperature during preparing a fine particle of polymer. Although it cannot be generally defined because a polymer composition or a glass-transition temperature must be taken into account, a specific surface area tends to be reduced by drying at an elevated temperature while it tends to be increased by drying at a lower temperature. Besides a drying temperature, a specific surface area of a fine particle of polymer depends on, in a complex manner, many factors such as a primary particle size, a glass-transition temperature of the polymer, a surface state of the primary particles and a particle structure. Therefore, the problems cannot be essentially solved only by defining a particle size, and a practical level of workability or processability can be achieved only by selecting a specific surface area within a particular range as in this invention.

The term "workability" practically carries more or less different meanings depending on a processing method used. It may be common in any case that a smaller amount of a plasticizer required for a plastisol may lead to higher freedom in compounding, to a lower viscosity of a resulting plastisol, and thus to good workability.

A processing method for a plastisol depends on an application so that some modification is needed for each processing method. Such modification are generally achieved by optimizing viscosity properties depending on a shear speed on a plastisol.

For example, an article to be coated is immersed in a plastisol and then drawn up in dip coating so that the a high shear speed is not applied to the plastisol. It is, therefore, preferable herein that a viscosity is low under a low shear speed.

In another case, e.g., a wallpaper or cloth prepared by calendar processing, a plastisol is coated on a line operated at a higher speed so that a relatively higher shear speed is applied to the plastisol. It is, therefore, preferable herein that a viscosity is low under a relatively higher shear speed.

For airless-spray coating, a plastisol is sprayed as a mist from a nozzle by applying a very high pressure to the plastisol for coating so that a very high shear speed is applied to the plastisol. It is, therefore, preferable herein that a viscosity is low under a very high shear speed.

In any case, it is necessary to define a specific surface area of a fine particle of polymer within the above particular range. Other materials such as inorganic fillers with a variety of attributes can be added to the plastisol to adjust a viscosity to a desired level under a given shear speed.

A fine particle of polymer for a plastisol of this invention is made of a non-halogenated polymer containing no halogen atoms such as acrylic polymers, styrene polymers, butadiene polymers and vinyl-acetate polymers as well as their copolymers including styrene-butadiene copolymers, acrylonitrile-butadiene copolymers and acryl-vinyl acetate copolymers.

These polymers can be selected depending on an application. For example, a styrene-butadiene copolymer may be used when a higher rubber elasticity is required while an acryl-vinyl acetate copolymer may be used when higher compatibility to a plasticizer is needed.

An acrylic polymer is preferably used in a fine particle of polymer for a plastisol of this invention. A more preferable acrylic polymer is that comprising at least 50 mol % of an alkyl methacrylate and/or an alkyl acrylate (hereinafter, referred to as an "alkyl (meth)acrylate" as appropriate) as a constituent monomer. That is, a polymer containing at least 50 mol % of an alkyl (meth)acrylate unit is preferable.

Since among monomers giving a non-halogenated polymer, an alkyl (meth)acrylate has quite many variations, it may be used to easily prepare a copolymer having a desired glass-transition temperature and solubility parameters in a wide range.

Such an acrylic polymer may be, therefore, used as a fine particle of polymer for a plastisol to control compatibility between the fine particle of polymer and a plasticizer within a desired range and to facilitate compatibility between storage stability and plasticity retention after deposition or molding which are important for a plastisol.

A glass-transition temperature of a polymer constituting a fine particle of polymer may be appropriately adjusted to provide a coating film or molding having a hardness, a strength, an elongation and an elastic modulus depending on an application.

When an alkyl (meth)acrylate unit is contained to a level of 50 mol % or more in a polymer constituting a fine particle of polymer, the properties of an acrylic polymer as described above can be easily achieved and improve freedom in designing a polymer for a plastisol.

Examples of the above alkyl (meth)acrylate includes (meth)acrylates of a linear alkyl alcohol such as methyl (meth)acrylate, ethyl (meth)acrylate, n-butyl (meth)acrylate, i-butyl (meth)acrylate, i-butyl (meth)acrylate, hexyl (meth) acrylate, 2-ethylhexyl (meth)acrylate and octyl (meth) acrylate; and (meth)acrylates of a circular alkyl alcohol such as cyclohexyl (meth)acrylate.

Among thease, preferable examples include methyl (meth) acrylate, n-butyl (meth)acrylate, i-butyl (meth) acrylate, t-butyl (meth)acrylate and 2-ethylhexyl (meth) acrylate. These monomers are readily available and are suitable to industrial practical use. This invention is, however, not limited to these specific monomers.

Examples of other monomers which may be used include carboxyl-containing monomers such as methacrylic acid, acrylic acid, itaconic acid, crotonic acid, maleic acid, fumaric acid, 2-succinoloyloxyethyl methacrylate-2-methacryloyloxyethylsuccinic acid, 2-maleinoloyloxyethyl methacrylate-2-methacryloyloxyethylmaleic acid, 2-phthaloyloxyethyl methacrylate-2-methacryloyloxyethylphthalic acid and 2-hexahydrophthaloyloxyethyl methacrylate-2-methacryloyloxyethylhexahydrophthalic acid; sulfonic-containing monomers such as allylsulfonic acid; carbonyl-containing (meth)acrylates such as acetoacetoxyethyl (meth) acrylate; hydroxy-containing (meth)acrylates such as 2-hydroxyethyl (meth)acrylate and 2-hydroxypropyl (meth) acrylate; epoxy-containing (meth)acrylates such as glycidyl (meth)acrylate; amino-containing (meth)acrylates such as N-dimethylaminoethyl (meth)acrylate and N-diethylaminoethyl (meth)acrylate; polyfunctional (meth) acrylates such as (poly)ethyleneglycol di(meth)acrylate, propyleneglycol di(meth)acrylate, 1,6-hexanediol di(meth) acrylate and trimethylolpropane tri (meth)acrylate; acrylamides and their derivatives such as diacetoneacrylamide, N-methylolacrylamide, N-methoxymethylacrylamide, N-ethoxymethylacrylamide and N-butoxymethylacrylamide; styrene and their derivatives; vinyl acetate; urethane-modified acrylates; epoxy-modified acrylates; and silicone-modified acrylates. These can be extensively used and can be selected depending on an application.

A fine particle of polymer for a plastisol of this invention preferably has two or more polymer layers having different compositions concentrically from the particle center to its surface.

A polyvinyl chloride has a strong intermolecular cohesive force so that a plasticizer infiltrates at a lower rate and thus a plastisol composition exhibits good storage stability without using a concentrical multilayer particle structure as described above. On the other hand, a non-halogenated polymer such as an acrylic polymer generally has a weak intermolecular cohesive force so that a plasticizer can easily infiltrate. Infiltration of the plasticizer may be delayed by forming a particle structure having two or more polymer layers concentrically from the particle center to the surface, using polymer components having different compositions as described above. In this manner, properties such as storage stability, property of curing by heating and plasticizer retention may be improved even when using a particulate non-halogenated polymer.

Examples of such a particle structure include a core shell type structure consisting of two layer of a core polymer and a shell polymer; a multi-step layer type structure consisting of three or more layers; and a gradient type structure having a semi-continuous composition variation using very thin layers. Among these, a core shell type of particle structure is, but not limited to, preferable in the light of easy preparation of a fine particle of polymer.

In such particle structures, it is preferable that compatibility of a polymer to a plasticizer in an inner layer close to the center is higher than that in an outer layer close to a particle surface. Such a configuration may improve storage stability of a plastisol, accelerate swelling and dissolution of a fine particle of polymer by a plasticizer during heating, and prevent bleed-out of the plasticizer after deposition or molding.

A fine particle of polymer for a plastisol may be prepared an appropriate polymerization technique such as emulsion polymerization, seed emulsion polymerization, soap-free emulsion polymerization, suspension polymerization and fine suspension polymerization. When a medium is not aqueous, dispersion polymerization in an organic medium or in a mixture of water and an organic medium or precipitation polymerization in an organic medium may be employed. A complex polymerization technique combining a plurality of these polymerization methods may be, if necessary, used.

In particular, for preparing a fine particle of polymer having a core shell type, multi-step layer type or gradient type particle structure, it is practical to use, among these methods, emulsion polymerization, seed emulsion polymerization or soap-free polymerization in an aqueous medium in the light of controllability of a particle structure and a higher polymer molecular weight obtained which may improve physical properties of a coating film or molding. For preparing primary particles with a relatively larger size, soap-free emulsion polymerization and fine suspension polymerization are preferable.

Since a fine particle of polymer prepared by any of these polymerization methods is generally obtained as a dispersion in which the particles are dispersed in a medium, a step of recovering a fine particle of polymer from a polymer dispersion is necessary. This recovery process may be conducted by any appropriate known technique such as spray drying, coagulation, freeze drying, centrifugation and filtration. Among these, spray drying is better because of controllability of particle properties and a higher yield.

For a fine particle of polymer of this invention, there are no restrictions to their secondary or higher structure as long as a specific surface area is within a range of 0.6 to 20.0 $m^2/g$. For example, the particles may have a secondary-particle structure of secondary particles consisting of primary particles aggregated by a weak cohesive force, secondary particles consisting of primary particles aggregated by a strong cohesive force or secondary particles mutually fused by heating. Alternatively, a higher-order structure may be formed by treatment (e.g., granulation) of these secondary particles.

These higher-order particle structures may be appropriately designed depending on an application or its requirements. For example, they may be designed for improving workability such as controlling powdering and flowability improvement or for improving physical properties such as modification of a dispersion state of a fine particle of polymer to a plasticizer.

A fine particle of polymer for a plastisol of this invention preferably has an average particle size of 500 nm or more in their primary particles constituting secondary or higher particles. A specific surface area of a polymer particle cannot be simply determined by a primary particle size because it is influenced in a complex manner not only by a primary particle size but also many factors such as a size distribution, a degree of fusion among primary particles and a secondary or higher structure. However, when primary particles have an average particle size of 500 nm or more, it is easy to control a specific surface area of a fine particle of polymer within a desired range by adjusting the other factors. Furthermore, it is preferable that an average particle size of primary particles is 10 μm or less for quickly conducting melting, deposition or molding for a short period.

A fine particle of polymer for a plastisol of this invention having a particular specific surface area may be prepared by any of the following methods.

a) A dispersion of a polymer having a relatively larger primary particle size is prepared and it is then dried under the conditions whereby heat fusion among particles occurs to a lower level.

b) A dispersion of a polymer having a relatively smaller primary particle size is prepared and it is then dried under the conditions whereby heat fusion among particles occurs to a higher level.

c) A dispersion of a polymer having a relatively larger primary particle size and having fine pores on a particle surface is prepared and it is then dried under the conditions whereby heat fusion among particles occurs to a lower level.

d) A dispersion of a polymer having a relatively larger primary particle size is prepared; to the dispersion is added a binder component which can be easily fused by heating; and the mixture is then dried.

For preparing a fine particle of polymer with a relatively larger primary particle size, a polymerization method such as soap-free polymerization and line suspension polymerization can be used. A fine particle of polymer prepared by these methods has a particle size about ten times as large as that by emulsion polymerization using an emulsifier. Soap-free emulsion polymerization as used herein means polymerization characterized in that an emulsifier is not contained during the step of initiation of forming a fine particle of polymer, where once polymer particle formation is initiated, i.e., during the step of particle growing, polymerization may be conducted using an emulsifier.

On the contrary, a polymer having a relatively smaller primary particle size may be prepared by emulsion polymerization using an emulsifier, i.e., a polymerization method characterized in that an emulsifier is contained at the initiation of forming a fine particle of polymer.

A fine particle of polymer of this invention in which a specific surface area is within a particular range and an oil absorption rate is a particular value or less may be prepared by any of the following methods.

a) During drying a polymer dispersion, a residence time in a drying chamber is extended as much as possible for avoiding rapid drying.

b) During drying a polymer dispersion, a difference between an evaporation temperature of a dispersion medium and an atmosphere temperature in the drying chamber for avoiding rapid drying.

c) During drying a polymer dispersion, a dispersion in which primary particles have a larger particle size is prepared for facilitating evaporation of a dispersion medium and also drying the dispersion at a drying temperature below a glass-transition temperature of the polymer for preventing excessive heat fusion among primary particles.

An excessively higher oil absorption rate of a fine particle of polymer may be often caused by the presence of a large hollow structure in the center of a dried polymer particle, which is formed during evaporation of a dispersion medium. According to any of the above methods, formation of such a hollow structure can be prevented.

These methods may be appropriately selected or, if necessary, combined depending on a polymer molecular weight, a glass-transition temperature, particle formation, a particle size, a particle structure and a surface structure, to prepare a fine particle of polymer in which both specific surface area and oil absorption rate are within particular ranges.

Among these, the following method may be preferably conducted as a controllable industrial process for preparation with a higher productivity.

An aqueous dispersion of a polymer having an average primary particle size of 500 nm or more is prepared by soap-free emulsion polymerization or fine suspension polymerization. An average particle size is preferably 10 μm or less.

The dispersion is dried by spray drying under the conditions of an atmospheric temperature of [a polymer glass-transition temperature (° C.) + 20° C.] or less, more preferably the polymer glass-transition temperature or less; and 50° C. or over in a drying chamber.

There is not an explicit academic definition for difference between fine suspension polymerization and suspension polymerization. Generally, suspension polymerization is a technique for obtaining particles with a particle size of 100 μm order, while fine suspension polymerization is used for obtaining relatively smaller particles with a particle size of about several μm to several tens μm. Differences in preparation include, but not limited to, that suspension polymerization uses a relatively smaller amount of a dispersant or dispersion aid and requires no special dispersing apparatuses other than a stirring device while fine suspension polymerization uses a relatively larger amount of a dispersant or dispersing aid or an optimal dispersant selection is needed and a special dispersing apparatus other than a stirring device is often used for make the monomers finer. Examples of a special dispersing apparatus include, but not limited to, homogenizers such as a high-pressure homogenizer and an ultrasonic homogenizer and a porous film such as an SPG film.

Besides a fine particle of polymer and a plasticizer, a plastisol composition of this invention may be combined with an inorganic filler, depending on an application.

An inorganic filler used may be appropriately selected depending on an application; for example, a filler such as calcium carbonate, aluminum hydroxide, perlite, clay, colloidal silica, mica powder, silica sand, diatomaceous earth, kaolin, talc, bentonite, glass powder and aluminum oxide; or a pigment such as titanium oxide and carbon black. Among these, preferable is, but not limited to, calcium carbonate in the light of universality, a price, handling properties, a specific gravity and availability.

As described above, a shear speed applied to a plastisol depends on its processing method. In particular, a shear speed applied to a plastisol is very high in coating by an airless spray and a conventional non-halogenated plastisol exhibits considerably poor processing suitability to an airless spray. Airless spray coating is generally used as the most suitable procedure for applying an undercoat material for endowing antichipping, rust prevention and sound isolation properties to a floor base or wheel house in an automobile or a body sealer applied for endowing water-tightness, airtightness, dust resistant property and damping property to a junction or joint of a steel plate constituting an automobile body.

According to this invention, a non-halogenated plastisol composition can be provided, which is suitable to a processing method in which a higher shear force is applied, such as airless spray coating, and has excellent viscosity properties. It will be described in detail.

A non-halogenated plastisol composition which is suitable to a processing method in which a higher shear force is applied, such as airless spray coating, and has excellent viscosity properties, does not contain a polymer containing halogen atoms such as polyvinyl chloride; is an acrylic plastisol containing a particulate acrylic polymer consisting of primary particles with an average particle size of 500 nm or more, a plasticizer and an inorganic filler; and has a viscosity of 0.1 to 1.0 Pa·s (25° C.) as determined with a shear speed of 10000 $sec^{-1}$ and 100 to 1000 Pa·s (25° C.) with a shear speed of 0.42 $sec^{1}$.

A plastisol composition of this invention suitable to a processing method in which a higher shear force is applied preferably has a viscosity of 0.1 to 1.0 Pa·s (25° C.) as determined with a shear speed of 10000 $sec^{-1}$. If a viscosity is too high at this shear speed, the composition is highly viscous when a high shear speed is applied by an airless spray so that fine atomization becomes difficult and an even and flat coating surface cannot be provided. If a viscosity is too low at this shear speed, atomized particles are easily spattered under usual conditions for airless spray coating, leading to deteriorated workability in coating. A viscosity at a shear speed of 10000 $sec^{-1}$ is preferably within a range of 0.1 to 1.0 Pa·s (25° C.), more preferably 0.3 to 0.8 Pa·s (25° C.). A viscosity within such a range is suitable because even coating can be conducted irrespective of a film thickness and spraying conditions.

Although airless spraying becomes relatively difficult, a viscosity outside of the above range may be used because there are no problems as long as an application method in which a shear speed is relatively low is used.

A plastisol composition of this invention suitable to a processing method in which a higher shear force is applied preferably has a viscosity of 100 to 1000 Pas (25° C.) at a shear speed of 0.42 $sec^{-1}$. If a viscosity is too low at this shear speed, an applied plastisol composition may be sagged so that, for example, an applied film having an adequate film thickness as an antichipping film cannot be formed. On the other hand, if the viscosity is too high, twisting may occur, leading to a deteriorated appearance. A viscosity at a shear speed of 0.42 $sec^{-1}$ is, therefore, preferably within a range of 100 to 1000 Pa·s (25° C.), more preferably 200 to 600 Pa·s. A viscosity within such a range is suitable because even coating can be conducted irrespective of a film thickness and spraying conditions.

In a plastisol composition of this invention suitable to a processing method in which a higher shear force is applied, a fine particle of polymer is preferably made of an acrylic polymer such as any of the above acrylic polymers. In particular, a polymer containing 50 mol % or more of an alkyl (meth)acrylate unit is preferable.

Furthermore, it is preferable that a fine particle of polymer is made of agglomerates consisting of a plurality of primary particles and that the primary particles constituting such a fine particle of polymer have an average particle size of 500 nm or more as is described above. Primary particles having an average particle size of 500 nm or more may facilitate controlling a specific surface area of the fine particle of polymer within a desired range so that the plastisol can have desired rheology. An average particle size of primary particles is preferably 10 μm or less for achieving quick melting or deposition for a short period.

There are no restrictions to an inorganic filler used in a plastisol composition of this invention suitable to a processing method in which a higher shear force is applied, but the above inorganic fillers and pigments may be used. A combination of inorganic fillers with an average particle size of less than 2.0 μm (C1) and of 2.0 μm or more (C2) in a ratio (by weight) of 30/70 to 70/30 is suitable to a processing method in which a higher shear force is applied.

An inorganic filler with an average particle size of less than 2.0 μm (C1) is effective for increasing a viscosity at a low shear speed and acts as an antisagging agent. When the ratio (by weight) of the inorganic filler (C1) is within a range of 30/70 to 70/30, sagging can be effectively prevented. Specifically, a plastisol has a viscosity adequately low at a high shear speed while being adequately thixotropic to prevent sagging at a low shear speed.

An inorganic filler with an average particle size of 2.0 μm or more (C2) is effective for reducing a viscosity at a high shear speed and may improve suitability to an airless spray.

When the ratio (by weight) of the inorganic filler (C2) is within a range of 30/70 to 70/30, suitability to an airless spray may be effectively improved.

A configuration as described above may provide a plastisol composition particularly suitable to a processing method in which a higher shear force is applied, such as airless spraying.

A plasticizer used in this invention is not specifically restricted and may be appropriately selected depending on an application or processing method of a plastisol. It is preferably a phthalic acid diester of an aliphatic alcohol having 7 to 10 carbon atoms, which is contained in 50 wt % or more of the total plasticizers because a phthalic acid diester is industrially readily produced, is highly available due to its lower price and therefore carries economic advantages. It has lower boiling point and vapor pressure than those in a phthalic acid diester of an aliphatic alcohol having 6 or less carbon atoms so that volatilization during deposition of a plastisol by heating may be considerably limited. It is more polar and has a lower molecular weight than a phthalic acid diester of an aliphatic alcohol having 11 or more carbon atoms so that it may allow a fine particle of polymer to be properly plasticized during deposition by heating, resulting in improvement of film properties such as strength and elongation. Examples of such a plasticizer include di-2-ethylhexyl phthalate (DOP), di-i-nonyl phthalate (DINP), di-n-nonyl phthalate (DNP) and di-i-decyl phthalate (DIDP).

Other examples of such a plasticizer may be a wide variety compounds; for example, dialkyl phthalates such as di-n-butyl phthalate (DBP), dihexyl phthalate and dioctyl phthalate; alkyl aryl phthalates such as alkyl benzyl phthalates including butyl benzyl phthalate (BBP); diaryl phthalates such as dibenzyl phthalate; dibasic acid esters such as adipates including dibutyl adipate and dioctyl adipate (DOA), dibutyl sebacate and dioctyl sebacate (DOS); triaryl phosphates such as tricresyl phosphate; trialkyl phosphates; alkyl aryl phosphates; ethers; polyesters; soybean oils such as epoxidated linseed oil and epoxidated soybean oil; citrates such as acetyl tributyl citrate (ATBC); aliphatic acid esters of glycelol; and polyethers.

These may be added depending on physical properties required to a plastisol composition, i.e., features of individual plasticizers such as cold resistance, flame resistance, oil resistance, a low viscosity and low thixotropy.

These plasticizers may be used alone or in combination of two or more depending on a purpose.

A blending proportion of a plasticizer and a fine particle of polymer may be appropriately selected because it may vary depending on an application or processing method of a resulting plastisol composition. Generally, a plasticizer is added preferably 50 to 300 wt parts, more preferably 60 to 200 wt parts, particularly 80 to 200 wt parts per 100 wt parts of a fine particle of polymer in the light of physical properties of a coating film or molding and viscosity properties of a plastisol. A blending proportion of a filler may be also appropriately selected depending on an application or processing method, and for example, a filler may be added in a range of 50 to 400 wt parts per 100 wt parts of a fine particle of polymer.

To a non-halogenated plastisol composition of this invention, a variety of additives may be added as necessary. Examples of such an additive include, but not limited to, diluents such as mineral turpentine and mineral spirit, antifoaming agents, antifungal agents, deodorants, antibacterial agents, surfactants, lubricants, ultraviolet absorbers, perfumes, foaming agents, leveling agents and adhesives.

In some applications, a non-halogenated plastisol composition of this invention may contain a block isocyanate and/or an amino compound containing an amino group having an active hydrogen as an adhesion aid and may be then applied to a cation electrodeposition plate. Such a plastisol containing an adhesion aid may be applied to a cation electrodeposition plate to generate a strong chemical bonding of plastisol film-adhesion aid-cation electrodeposition plate so that a strongly adhered coating film may be formed, resulting in, for example, improvement in antichipping, damping and waterproof properties of the coating film.

A non-halogenated plastisol composition of this invention may be used for producing articles including, but not limited to, various film products and moldings in a wide variety of applications such as wallpapers, undercoats for an automobile, body sealers for an automobile, carpet backing materials, floor materials, paints and toys.

In particular, this invention can provide, because viscosity properties of a plastisol are controlled, a plastisol composition having excellent processability in coating, sealing, specifically in a body sealer or undercoat for an automobile.

EXAMPLES

This invention will be specifically described with reference to *the following prophetic* Examples.

The following evaluation methods are used in Examples.

[[] Primary Particle Size[]]

A primary particle size of a fine particle of polymer [was] *is* determined using a laser diffraction-diffusion type size distribution measurement device LA-910 (Horiba, Ltd.). In this determination, purified water [was] *is* used as a dispersing medium and ultrasonication for 2 min [was] *is* conducted with an ultrasonic generator as an accessory to this device for preventing aggregation of particles.

[[] Specific Surface Area[]]

A specific surface area of a fine particle of polymer [was] *is* determined using a nitrogen-adsorption type surface area measurement device (Horiba, Ltd.; SA-6200) to calculate a specific surface area per one gram of a fine particle of polymer (unit: $m^2/g$).

[[] Oil Absorption Rate[]]

An oil absorption rate of a fine particle of polymer (unit: mL/g) [was] *is* determined by a method described in JIS K-5101.

[[] Minimum Plasticizer Amount[]]

A plasticizer (diisononyl phthalate (DINP)) [was] *is* gradually added to 100 wt parts of a fine particle of polymer and the total amount until the system became flowable [was] *is* defined as a minimum requirement for forming a plastisol, i.e., a minimum plasticizer amount (unit: phr).

[[] Determination of a Viscosity at a Low Shear Speed[]]

A plastisol composition obtained [was] *is* adjusted to 25° C. in a thermostatic bath and [was] *is* then determined for its viscosity (unit: Pa·s) at a rotating speed of 2 rpm using a Brookfield viscometer (Toki Sangyo Ltd.; BH type viscometer, No.7 rotor), where a shear speed [was] *is* 0.42 $sec^{-1}$.

[[] Storage Stability[]]

A plastisol composition obtained [was] *is* kept at 30° C. in a thermostatic chamber. After one week, the composition [was] *is* removed from the bath to determine a viscosity. The viscosity measurement and a viscosity immediately after producing the plastisol composition [were] *are* used to calculate a viscosity-increasing rate (units: %) for the plastisol according to the following equation:

(a viscosity after keeping at 30° C. for 1 week/an initial viscosity)×100(%)

where a viscosity means one at a low shear speed.

[[] Determination of Strength of a Molding[]]

A plastisol composition obtained [was] *is* applied to a glass plate with a released paper to a thickness of 2 mm. It [was] *is* molded by heating in an oven at 180° C. for 10 min to form an even film. After peeling, the film [was] *is* cut into a No. 2 dumbbell shape to give a test piece, according to a procedure described in JIS K-7113, and the test piece [was] *is* measured for a strength of a cured film (unit: MPa) using a tensilon measuring device under the conditions of a test speed of 200 mm/min, a load-cell rating of 980 N and an ambient temperature of 25° C. during measurement.

[[] Determination of a Viscosity at a High Shear Speed[]]

A plastisol composition obtained [was] *is* adjusted to 25° C. in a thermostatic bath and [was] *is* then measured for its viscosity using a Herculess high-shear viscometer (Kumagaya Riki Kogyo Ltd.). Specifically, variation in a viscosity [was] *is* determined as a rotation speed [was] *is* continuously increased from 0 rpm to 8800 rpm over 30 sec using a C type bob. Although the maximum shear speed [was] *is* about 38000 $sec^{-1}$, a viscosity [was] *is* read from a graph of shear speed vs viscosity obtained at the time of a shear speed of 10000 $sec^{-1}$.

[[] Suitability to an Airless Spray[]]

Each of the plastisol compositions from Examples and Comparative Examples [was] *is* applied to a cation electrodeposition plate (a dull steel plate to which an epoxy cationic electrodeposition paint [was] *is* applied) using an airless spray gun equipped with a nozzle tip GGO-517 (Nippon Gray Ltd.; a tip aperture of 0.432 mm). The coating gun [was] *is* operated at a distance of about 30 cm from the test plate while being kept perpendicular to the cation electrodeposition plate. A spraying pressure [was] *is* 13.0 MPa and a temperature [was] *is* about 25° C. Suitability to an airless spray [was] *is* evaluated according to the following ratings.

◎: A sol is sprayed as a fine fume. Good suitability to an airless spray.

o: A fumed sol provides slightly coarse droplets. Moderately good suitability to an airless spray.

Δ: Spraying is difficult under the above conditions. Suitability to an airless spray is inadequate, but it may be suitably used in a processing method other than an airless spray.

[[] Antisagging Property[]]

A test plate on which a composition [was] *is* applied as described above [was] *is* vertically placed and left for 30 min. It [was] *is* heated at 140° C. for 20 min to form a film. Then, the largest film thickness where sagging did not occur in a film (a sagging critical film thickness) [was] *is* determined. A film thickness measured [was] *is* evaluated according to the following ratings.

◎: 4 mm or more. Good antisagging property.

o: 2 mm or more to less than 4 mm. Moderately good antisagging property.

Δ: less than 2 mm. Antisagging property is inadequate, but it may be suitably used in a processing method other than an airless spray.

[[] Adhesiveness[]]

As described in the above test for suitability to an airless spray, a composition [was] *is* applied to a film thickness of 1000 μm, and the product [was] *is* heated at 140° C. for 20 min to form a film. The coating test plate [was] *is* patterned, using a knife, as a matrix of 11×11 parallel lines with 2 mm intervals which reached the metal surface, to form a lattice pattern of scotches such that 10×10=100 grids are formed in 4 $cm^2$. On the coated surface [was] *is* firmly attached a cellophane tape, which [was] *is* then peeled by quickly pulling it. Grids in the plastisol composition film adhering to the cellophane tape which [was] *is* peeled from the cation electrodeposition plate [were] *are* counted. Adhesiveness [was] *is* evaluated from the number of grids peeled from the coating film according to the following ratings.

◎: 10 or less.

○: 11 to 30.

X: 31 or more.

Example 1

Preparation of a Fine Particle of Polymer (A1)

In a 5 liter four-necked flask equipped with a thermometer, a nitrogen-gas inlet, a stirrer, a dropping funnel and a reflux condenser [was] *is* placed 1414 g of purified water, and nitrogen gas [was] *is* adequately bubbled into the water for 30 min to purge dissolved oxygen in the purified water. After stopping nitrogen gas, 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing 638.4 g of methyl methacrylate, 487.8 g of n-butyl methacrylate, 9.80 g of sodium dialkylsulfosuccinate (Kao Corporation, Trade name: Perez O-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 294.6 g of methyl methacrylate, 179.1 g of i-butyl methacrylate, 14.5 g of methacrylic acid, 4.20 g of sodium dialkylsulfosuccinate (Kao Corporation, Trade name: Perex O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A1).

Example 2

Preparation of a Fine Particle of Polymer (A2)

In a 5 liter four-necked flask equipped with a thermometer, a nitrogen-gas inlet, a stirrer, a dropping funnel and a reflux condenser [was] *is* placed 720 g of purified water, and nitrogen gas [was] *is* adequately bubbled into the water for 30 min to purge dissolved oxygen in the purified water. After stopping nitrogen gas, 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing-638.4 g of methyl methacrylate, 487.8 g of n-butyl methacrylate, 9.80 g of sodium dialkylsulfosuccinate (Kao Corporation, Trade name: Perex O-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 294.6 g of methyl methacrylate, 179.1 g of i-butyl methacrylate, 14.5 g of methacrylic acid, 4.20 g of sodium dialkylsulfosuccinate (Kao Corporation, Trade name: Perex O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A2).

Example 3

Preparation of a Fine Particle of Polymer (A3)

A mixture of 911.8 g of methyl methacrylate, 696.8 g of n-butyl methacrylate, 28.0 g of sodium dialkylsulfosuccinate and 14.0 g of benzoyl peroxide [was] *is* subject to micro suspension polymerization using poly(sodium acrylate) as a dispersion stabilizer, at 80° C. with vigorous stirring to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A3).

Example 4

Preparation of a Fine Particle of Polymer (A4)

In a 5 liter four-necked flask equipped with a thermometer, a nitrogen-gas inlet, a stirrer, a dropping funnel and a reflux condenser [was] *is* placed 2240 g of purified water, and nitrogen gas [was] *is* adequately bubbled into the water for 30 min to purge dissolved oxygen in the purified water. After stopping nitrogen gas; 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing 638.4 g of methyl methacrylate, 487.8 g of n-butyl methacrylate, 9.80 g of sodium dialkylsulfosuccinate (Kao Corporation, Trade name: Perex O-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 294.6 g of methyl methacrylate, 179.1 g of i-butyl methacrylate, 14.5 g of methacrylic acid, 4.20 g of sodium dialkylsulfosuccinate (Kao Corporation, Trade name: Perex O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A4).

Example 5

Preparation of a Fine Particle of Polymer (A5)

In a 5 liter four-necked flask equipped with a thermometer, a nitrogen-gas inlet, a stirrer, a dropping funnel and a reflux condenser [was] *is* placed 1414 g of purified water and 14.0 g of polyoxyethylenenonyl phenyl ether (Kao Corporation, Trade name: Emulgen 920), and nitrogen gas [was] *is* adequately bubbled into the mixture for 30 min to purge dissolved oxygen in the purified water. After stopping nitrogen gas, 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing 638.4 g of methyl methacrylate, 487.8 g of n-butyl methacrylate, 9.80 g of sodium dialkylsulfosuccinate (Kao Corporation, Trade name: Perex o-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 294.6 g of methyl methacrylate, 179.1 g of i-butyl methacrylate, 14.5 g of methacrylic acid, 4.20 g of sodium dialkylsulfosuccinate (Kao Corporation, Trade name: Perex O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara-Kakoki Ltd., L-8 type) to provide a fine particle of polymer (A5).

Example 6

Preparation of a Fine Particle of Polymer (A6)

In a 5 liter four-necked flask equipped with a thermometer, a nitrogen-gas inlet, a stirrer, a dropping funnel and a reflux condenser [was] *is* placed 1120 g of purified water, and nitrogen gas [was] *is* adequately bubbled into the water for 30 min to purge dissolved oxygen in the purified water. After stopping nitrogen gas, 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing 638.4 g of methyl methacrylate, 487.8 g of n-butyl methacrylate, 9.80 g of sodium dialkylsulfosuccinate (Kao Corporation, Trade name: Perex O-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 193.6 g of methyl methacrylate, 218.7 g of styrene, 14.5 g of methacrylic acid, 4.20 g of sodium dialkylsulfosuccinate (Kao Corporation, Trade name: Perex O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A6).

Comparative Example 1

Preparation of a Fine Particle of Polymer (A7)

A mixture of 911.8 g of methyl methacrylate, 696.8 g of n-butyl methacrylate, 14.0 g of sodium dialkylsulfosuccinate and 14.0 g of benzoyl peroxide [was] *is* subject to fine suspension polymerization using poly(sodium acrylate) as a dispersion stabilizer, at 80° C. with vigorous stirring to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A7).

Comparative Example 2

Preparation of a Fine Particle of Polymer (A8)

In a 5 liter four-necked flask equipped with a thermometer, a nitrogen-gas inlet, a stirrer, a dropping funnel and a reflux condenser [was] *is* placed 1414 g of purified water and 14.0 g of polyoxyethylenenonyl phenyl ether (Kao Corporation, Trade name: Emulgen 930), and nitrogen gas [was] *is* adequately bubbled into the mixture for 30 min to purge dissolved oxygen in the purified water. After stopping nitrogen gas, 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing 638.4 g of methyl methacrylate, 487.8 g of n-butyl methacrylate, 9.80 g of sodium dialkylsulfosuccinate (Kao Corporation, Trade name: Perex o-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 294.6 g of methyl methacrylate, 179.1 g of i-butyl methacrylate, 14.5 g of methacrylic acid, 4.20 g of sodium dialkylsulfosuccinate (Kao Corporation, Trade name: Perez O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 2500.0 rpm using a spray drier (Ogawara Kakoki Ltd., L-8 type) to provide a fine particle of polymer (A8).

Comparative Example 3

Preparation of a Fine Particle of Polymer (A9)

In a 5 liter four-necked flask equipped with a thermometer, a nitrogen-gas inlet, a stirrer, a dropping funnel and a reflux condenser [was] *is* placed 1414 g of purified water and 28.0 g of sodium mixed aliphatic acid (Kao Corporation, Trade name: Flake Mercer), and nitrogen gas [was] *is* bubbled into the purified water. After stopping nitrogen gas, 45.6 g of methyl methacrylate and 34.9 g of n-butyl methacrylate [were] *are* added and the mixture [was] *is* stirred at 150 rpm while being heated to 80° C. After the internal temperature became 80° C., 0.70 g of potassium persulfate dissolved in 28 g of purified water [was] *is* added at one time to initiate soap-free polymerization. The mixture [was] *is* stirred at the same temperature, 80° C., for 60 min to provide a seed particle dispersion.

Then, to the seed particle dispersion [was] *is* added dropwise a monomer emulsion (prepared by mixing 638.4 g of methyl methacrylate, 487.8 g of n-butyl methacrylate, 9.80 g of sodium dialkylsulfosuccinate (Kao Corporation, Trade name: Perex O-TP) and 490.0 g of purified water and stirring the mixture to give an emulsion) over 3 hours, and the mixture [was] *is* stirred at 80° C. for additional one hour to provide a polymer dispersion.

Then, to the polymer dispersion [was] *is* added dropwise a monomer emulsion (prepared by mixing 294.6 g of methyl methacrylate, 179.1 g of i-butyl methacrylate, 14.5 g of methacrylic acid, 4.20 g of sodium dialkylsulfosuccinate (Kao Corporation, Trade name: Perex O-TP) and 210.0 g of purified water and stirring the mixture to give an emulsion) over 1.5 hours, and the mixture [was] *is* stirred at 80° C. for additional one hour to provide a polymer dispersion.

The resulting polymer dispersion [was] *is* cooled to room temperature and [was] *is* spray-dried under the conditions of an inlet temperature of 170° C., an outlet temperature of 75° C. and an atomizer rotation number of 25000 rpm using a spray drier (Ogawara Kakoki Ltd., L-8 type) to provide a fine particle of polymer (A9).

Comparative Example 4

A commercially available vinyl chloride particulate homopolymer (Nippn Zeon Ltd.) [was] *is* sieved for classification to provide a fine particle of polymer (A10).

Comparative Example 5

A commercially available vinyl chloride/vinyl acetate a particulate copolymer ([Nippn] *Nippon* Zeon Ltd.) [was] *is* sieved for classification to provide a fine particle of polymer (A11).

Examples 7 to 13

Preparation of Fine Particles of Polymer (A12) to (A18)

Fine particles of polymer (A12) to (A18) [were] *are* prepared as described for preparation of a fine particle of polymer (A1) except using the compositions shown in Table 1 as a monomer composition.

Table 1 summarizes the compositions of the above fine: particles of polymer (A1) to (A18), particle structures, primary particle sizes, specific surface area and oil absorption rates.

HEMA: 2-hydroxyethyl methacrylate
AAEM: acetoacetoxyethyl methacrylate
GMA: glycidyl methacrylate
St: styrene
VC: vinyl chloride
VAc: vinyl acetate.

Example 14

Preparation of a Plastisol

To 100 wt parts of the above fine particle of polymer (A1) [was] *is* added 100 wt parts of diisononyl phthalate (DINP) and the mixture [was] *is* kneaded at room temperature for 1 min with a homodisper (Tokushu Kika Industries Ltd., Trade name: TK Homodisper) at about 3000 rpm to provide a homogenous mixture, which [was] *is* then defoamed in vacuo for 30 min to give a plastisol composition.

TABLE 1

| Polymer No. | Polymer composition (mol %) | Particle Structure | Particle size (μm) | Specific surface area ($m^2/g$) | Oil absorption rate (mL/g) | Minimum plasticizer amount (phr) |
|---|---|---|---|---|---|---|
| Al | (MMA/nBMA) ← (MMA/iBMA/MAA) | Core | 0.69 | 8.1 | 0.70 | 75 |
| | 70(65/35) ← 30(70/30/4) | Shell | | | | |
| A2 | (MMA/nBMA) ← (MMA/iBMA/MAA) | Core | 1.45 | 4.5 | 0.55 | 60 |
| | 70(65/35) ← 30(70/30/4) | Shell | | | | 70 |
| A3 | MMA/nBMA | Homogeneous | 8.60 | 0.8 | 0.62 | |
| | 65/35 | | | | | |
| A4 | (MMA/nBMA) ← (MMA/iBMA/MAA) | Core | 0.48 | 12.1 | 0.80 | 90 |
| | 70(65/35) ← 30(70/30/4) | Shell | | | | |
| A5 | (MMA/nBMA) ← (MMA/iBMA/MAA) | Core | 0.29 | 17.5 | 1.00 | 120 |
| | 70(65/35) ← 30(70/30/4) | Shell | | | | |
| A6 | (MMA/nBMA) ← (MMA/St/MAA) | Core | 1.10 | 5.6 | 0.62 | 70 |
| | 70(65/35) ← 30(46/50/4) | Shell | | | | |
| A7 | MMA/nBMA | Homogeneous | 18.00 | 0.4 | 0.40 | 50 |
| | 65/35 | | | | | |
| A8 | (MMA/nBMA) ← (MMA/iBMA/MAA) | Core | 0.21 | 26.0 | 1.10 | 130 |
| | 70(65/35) ← 30(70/30/4) | Shell | | | | |
| A9 | (MMA/nBMA) ← (MMA/iBMA/MAA) | Core | 0.10 | 50.0 | 1.20 | 145 |
| | 70(65/35) ← 30(70/30/4) | Shell | | | | |
| A10 | VC | Homogeneous | 6.30 | 1.2 | 0.58 | 65 |
| A11 | VC/VAc | Homogeneous | 2.20 | 2.8 | 0.55 | 65 |
| A12 | (MMA/nBMA) ← (MMA/iBMA/MAA/HEMA) | Core | 0.60 | 5.8 | 0.64 | 75 |
| | 50(65/35) ← 50(67/29/2/2) | Shell | | | | |
| A13 | (MMA/nBMA) ← (MMA/iBMA/MAA/HEMA) | Core | 1.06 | 5.7 | 0.66 | 75 |
| | 50(65/35) ← 50(67/29/2/2) | Shell | | | | |
| A14 | (MMA/nBMA) ← (MMA/iBMA/MAA/HEMA) | Core | 1.94 | 6.1 | 0.65 | 75 |
| | 50(65/35) ← 50(67/29/2/2) | Shell | | | | |
| A15 | (MMA/nBMA)-(MMA/iBMA/MAA/HEMA) | Core | 0.36 | 5.6 | 0.66 | 75 |
| | 50(65/35) ← 50(67/29/2/2) | Shell | | | | |
| A16 | (MMA/nBMA) ← (MMA/iBMA/MAA/HEMA) | Core | 0.12 | 5.6 | 0.68 | 75 |
| | 50(65/35) ← 50(67/29/2/2) | Shell | | | | |
| A17 | (MMA/nBMA/AAEM) ← (MMA/iBMA/MAA/AAEM) | Core | 1.06 | 6.2 | 0.72 | 80 |
| | 50(63/35/2) ← 50(67/29/2/2) | Shell | | | | |
| A18 | (MMA/nBMA/OMA) ← (MMA/iBMA) | Core | 1.06 | 7.0 | 0.68 | 75 |
| | 50(63.35/2) ← 50(70/30) | Shell | | | | |

In the polymer compositions in Table 1, the symbol "←" indicates a core-shell structure. Specifically, compositions of the left and the right sides of the symbol "←" are a core and a shell polymers, respectively. A number in parentheses indicates a copolymer composition (mol %) in a core or shell polymer while a number outside of parentheses indicates a component rate (mol %) of a core or shell polymer to the whole core-shell structure particles.

Abbreviations in Table 1 have the following meanings.
MMA: methyl methacrylate
nBMA: n-butyl methacrylate
iBMA: i-butyl methacrylate
MAA: methacrylic acid Examples 15 to 35 and Comparative Examples 6 to 10

Preparation of Plastisols

Plastisol compositions [were] *are* prepared by mixing a plasticizer and a filler according to Tables 2 and 3 to 100 wt parts of fine particles of polymer (A2 to A18) as described in Example 14. When blending a block isocyanate or polyamide-polyamine, 5 wt part [was] *is* added to 100 wt parts of a fine particle of polymer and the mixture [was] *is* again-kneaded at about 3000 rpm for 1 min with a homodisper (Tokushu Kika Industries Ltd., Trade name: TK Homodisper) to provide a homogenous mixture, which [was] *is* then defoamed in vacuo for 30 min to give a plastisol composition.

Table 2 shows compounding examples of a plastisol consisting of a fine particle of polymer and a plasticizer without a filler, while Table 3 shows compounding examples of a plastisol further comprising another component such as a filler.

TABLE 2

| | Fine particle of polymer | DINP (wt. part) | Presence of halogen atoms | Low shear viscosity (Pa · s) | Storage stability (%) | High shear viscosity (Pa · s) | Strength (MPa) |
|---|---|---|---|---|---|---|---|
| Ex. 14 | Al | 100 | No | 8.4 | 32 | — | 3.8 |
| Ex. 15 | A2 | 100 | No | 8.3 | 28 | — | 3.5 |
| Ex. 16 | A3 | 100 | No | 6.3 | 17 | — | 2.8 |
| Ex. 17 | A4 | 100 | No | 17.1 | 48 | — | 3.3 |
| Ex. 18 | A5 | 100 | No | 16.5 | 55 | — | 3.8 |
| Ex. 19 | A6 | 100 | No | 7.6 | 33 | — | 2.7 |
| Comp. Ex. 6 | A7 | 100 | No | 6.5 | 10 | — | 0.3 |
| Comp. Ex. 7 | A8 | 100 | No | 82.7 | 250 | — | 1.7 |
| Comp. Ex. 8 | A9 | 100 | No | Over a detection limit | >200 | — | 1.5 |
| Comp. Ex. 9 | A10 | 100 | Yes | 5.5 | 17 | — | 4.8 |
| Comp. Ex. 10 | A11 | 100 | Ycs | 5.7 | 13 | — | 3.2 |

TABLE 3

| | Fine particle of polymer | Calcium carbonate Ave. particle size (μm) (Mix. ratio (%)) Fine particle | Coarse particle | DINP (wt. part) | Block isocyanate | Polyamide polyamine | Halogen | Low shear viscosity (Pa · s) | Storage stability (%) |
|---|---|---|---|---|---|---|---|---|---|
| Ex. 20 | A12 | Neolite SP150 0.07(50%) | NS #500 4.44(50%) | 140 | Yes | Yes | No | 370 | 5 |
| Ex. 21 | A13 | Neolite SP150 0.07(50%) | NS #500 4.44(50%) | 140 | Yes | Yes | No | 340 | 4 |
| Ex. 22 | A14 | Neolite SP150 0.07(50%) | NS #500 4.44(50%) | 140 | Yes | Yes | No | 280 | 7 |
| Ex. 23 | A13 | Neolite SP150 0.07(100%) | No | 160 | Yes | Yes | No | 585 | 12 |
| Ex. 24 | A13 | Neolite SP150 0.07(90%) | NS #500 4.44(10%) | 140 | Yes | Yes | No | 452 | 6 |
| Ex. 25 | A13 | NS #2300 0.97(100%) | No | 140 | Yes | Yes | No | 166 | 14 |
| Ex. 26 | A13 | Neolite SP150 0.07(50%) | NS #500 4.44(50%) | 130 | Yes | Yes | No | 870 | 7 |
| Ex. 27 | A13 | Neolite SP150 0.07(100%) | No | 180 | Yes | Yes | No | 430 | 14 |
| Ex. 28 | A13 | Neolite SP150 0.07(25%) | NS #500 4.44(50%) | 140 | Yes | Yes | No | 152 | 4 |
| Ex. 29 | A13 | No | NS #500 4.44(100%) | 140 | Yes | Yes | No | 20 | 2 |
| Ex. 30 | A13 | Neolite SP150 0.07(50%) | NS #500 4.44(50%) | 120 | Yes | Yes | No | 1750 | 7 |
| Ex. 31 | A15 | Neolite SP150 0.07(50%) | NS #500 4.44(50%) | 140 | Yes | Yes | No | 1100 | 7 5 |
| Ex. 32 | A16 | Neolite SP150 0.07(50%) | NS #500 4.44(50%) | 140 | Yes | Yes | No | 2440 | 5 |
| Ex. 33 | A17 | Neolite SP150 0.07(50%) | NS #500 4.44(50%) | 140 | Yes | No | No | 320 | 4 |
| Ex. 34 | A18 | Neolite SP150 0.07(50%) | NS #500 4.44(50%) | 140 | No | Yes | No | 340 | 3 |
| Ex. 35 | A17 | Neolite SP150 0.07(50%) | NS #500 4.44(50%) | 140 | No | No | No | 300 | 2 |

| | High shear viscosity (Pa · s) | Suitability to airless spray | Anti-sagging | Adhesive-ness | Strength (MPa) |
|---|---|---|---|---|---|
| Ex. 20 | 0.55 | ◎ | ◎ | ○ | 2.2 |
| Ex. 21 | 0.50 | ◎ | ◎ | ○ | 2.3 |
| Ex. 22 | 0.49 | ◎ | ◎ | ○ | 2.1 |
| Ex. 23 | 0.28 | ○ | ◎ | ○ | 2.5 |
| Ex. 24 | 0.83 | ○ | ◎ | ○ | 2.3 |
| Ex. 25 | 0.60 | ◎ | ○ | ○ | 2.8 |
| Ex. 26 | 0.79 | ◎ | ◎ | ○ | 2.4 |
| Ex. 27 | 0.07 | Δ | ◎ | ○ | 2.7 |

TABLE 3-continued

| | | | | | |
|---|---|---|---|---|---|
| Ex. 28 | 1.30 | Δ | ○ | ○ | 2.1 |
| Ex. 29 | 0.89 | ○ | Δ | ○ | 1.9 |
| Ex. 30 | 1.35 | Δ | ◎ | ○ | 2.2 |
| Ex. 31 | 0.68 | ◎ | ◎ | ○ | 2.5 |
| Ex. 32 | 1.22 | Δ | ◎ | ○ | 2.3 |
| Ex. 33 | 0.48 | ◎ | ◎ | ◎ | 2.4 |
| Ex. 34 | 0.58 | ◎ | ◎ | ◎ | 2.2 |
| Ex. 35 | 0.46 | ◎ | ◎ | ○ | 2.1 |

Abbreviations in Table 3 have the following meanings.

Neolite SP150: Takehara Chemicals Ltd., trade name: Neolite SP 150

NS#2300: Nitto Hunka Ltd., trade name: NS#2300

NS#500: Nitto Hunka Ltd., trade name: NS#500

Block isocyanate: Kyoei Chemicals Ltd., trade name: AM-801

Polyamide-polyamine: Fuji Kasei Ltd., trade name: Tomaide 275.

Discussion on Examples 1 (14) and 2 (15)

Fine particles of polymer (A1, A2) in Examples 1 and 2 had a specific surface area within a range required in this invention and also an oil absorption rate within a preferable range; contain preferable types of monomer unit; and had a preferable particle structure. Plastisols prepared from these fine particles of polymer (Examples 14 and 15) contained no halogen atoms and of course, articles produced from these also contained no halogen atoms. These fine particles of polymer have a specific surface area and an oil absorption rate within optimum ranges so that the amount of a plasticizer required for compounding may be reduced and a resulting plastisol has an excellent viscosity and excellent storage stability. Furthermore, they had a core-shell particle structure so that a molding after heating exhibited good strength, resulting in compatibility between workability and processability.

Discussion on Example 3 (16)

A fine particle of polymer (A3) in Example 3 had a specific surface area of 0.8 m/g, which [was] *is* within a range required in this invention. Thus, a resulting plastisol composition (Example 16) exhibited an improved, i.e., low, viscosity and good stability storage. A molding had strength within an adequately practicable range although the strength [was] *is* slightly lower than those for the moldings (Examples 14 and 15) for the core-shell type fine particles of polymer (A1, A2).

Discussion on Example 4 (17)

A fine particle of polymer (A4) in Example 4 had a E3 specific surface area of 12.1 which [was] *is* within a range required in this invention. Thus, a resulting plastisol composition (Example 17) exhibited a low viscosity and good stability storage. Since an average particle size of primary particles [was] *is* 0.48 μm which is slightly lower than the lower limit of a preferable range, a viscosity [was] *is* slightly higher than those for the plastisol compositions (Examples 14 and 15) using fine particles of polymer (A1, A2) with an average particle size of primary particles of 500 nm or more. It was, however, within an adequately practicable range.

Discussion on Example 5 (18)

A fine particle of polymer (A5) in Example 5 had a specific surface area of 17.5 which [was] *is* within a range required in this invention. Thus, a resulting plastisol composition (Example 18) exhibited a low viscosity and good stability storage. Since an oil absorption rate [was] *is* 1.00 cc/g which [was] *is* slightly higher than the upper limit of a preferable range, a minimum amount of a plasticizer required for preparing a plastisol [was] *is* slightly higher, but it [was] *is* within an adequately practicable range.

Discussion on Example 6 (19)

In Example 6, an acrylic monomer [was] *is* combined with styrene for preparing a polymer, but the resulting fine particle of polymer exhibited a specific surface area, an oil absorption rate and a particle structure within required or preferable ranges in this invention. The resulting plastisol exhibited slightly lower storage stability and strength than those for the plastisols (Examples 14 and 15) using the fine particles of polymer (A1, A2) prepared from an acrylic monomer alone, but they [were] *are* within adequately practicable ranges.

Discussion on Comparative Example 1 (6)

A fine particle of polymer (A7) in Comparative Example 1 prepared by suspension polymerization had a specific surface area of 0.4 $m^2$/g, which [was] *is* outside of a range required in this invention. Therefore, although it has an advantage that a plastisol can be prepared with a small amount of a plasticizer, a fine particle of polymer is dissolved too slowly to provide a homogeneous molding in a short period when attempting a molding by heating a resulting plastisol composition (Example 6), leading to a molding with significantly reduced strength. In other words, the plastisol exhibited good workability, but significantly inferior processability.

Discussion on Comparative Examples 2 (7) and 3 (8)

A particulate acrylic polymer having a core-shell structure (A8, A9) in Comparative Examples 2 and 3 had a specific surface area outside of a range required in this invention. In both cases, a minimum amount of a plasticizer required for providing a plastisol was, therefore, very high. Specifically, they [were] *are* 130 and 145 wt parts in Comparative Examples 2 and 3, respectively. Resulting plastisols (Examples 7 and 8) had a higher viscosity, leading to extremely poor workability.

Discussion on Comparative Examples 4 (9) and 5 (10)

Comparative Examples 4 and 5 used a commercially available polyvinyl chloride. These Examples used a halogen-containing material and therefore, resulting plastisol compositions (Comparative Examples 9 and 10) contain halogen atoms. They, thus, did not provide a non-halogenated material for which this invention strives. These Comparative Examples [were] *are* described for performance comparison with this invention.

Discussion on Examples 20 to 35

In all of Examples 20 to 35, a fine particle of polymer with a specific surface area within in a range required in this invention [was] *is* used and an inorganic filler [was] *is* added to provide a plastisol composition. Herein, workability in a processing method in which a high shear force is applied by, for example, an airless spray is discussed in detail. The results will be described below.

Discussion on Example 20

A plastisol composition in Example 20 contains a fine particle of polymer (A12) with a primary particle size of 600 nm and a 50:50 (by weight) mixture of inorganic fillers with average particle sizes of 0.07 μm and 4.44 μm. In this composition, a size distribution of the inorganic filler [was] *is* within an optimum range and a viscosity of the resulting plastisol composition [was] *is* also within an optimum range, i.e., 0.55 Pa·s at a high shear speed (10000 $sec^{-1}$) and 370 Pa·s at a low shear speed (0.42 $sec^{-1}$). It, therefore, exhibited good suitability to an airless spray to provide a flat coating surface without irregularity and to prevent paint sagging, resulting in a considerably excellent coating film. Furthermore, since the plastisol composition contains a block isocyanate and polyamide-polyamine, adhesiveness to a cation electrodeposition plate [was] *is* good.

Discussion on Examples 21 and 22

Examples 21 and 22 used fine particles of polymer (A13 and A14) with a primary particle size larger than that in Example 20. The inorganic filler used herein [was] *is* the same as Example 20 and [was] *is* blended with the same ratio. In these examples, viscosity values at both high and low shear speeds [were] *are* within optimum ranges and quite good evaluation results including suitability to an airless spray [were] *are* obtained. It indicates that a fine particle of polymer with a particle size in such a level may be used to provide good results.

Discussion on Examples 23 and 24

Example 23 used the same fine particle of polymer as that in Example 21, but used an inorganic filler only with a smaller particle size and a plasticizer in an increased amount. In this example, a viscosity at a high shear speed [was] *is* slightly lower than the lower limit of the most preferable range, but [was] *is* within an adequately preferable range. It gave good results including suitability to an airless spray.

Example 24 used the same fine particle of polymer as that in Example 21, but a ratio of an inorganic filler [was] *is* changed. In this example, a viscosity at a high shear speed [was] *is* slightly higher than the upper limit of the most preferable range, but [was] *is* within an adequately preferable range. It gave good results including suitability to an airless spray.

Discussion on Examples 25 and 26

Example 25 used the same fine particle of polymer as that in Example 21, but used an inorganic filler with a modified particle size of 0.97 μm alone. In this example, a viscosity at a low shear speed [was] *is* slightly lower than the lower limit of the most preferable range, but [was] *is* within an adequately preferable range, giving good results.

Example 26 used the same fine particle of polymer and inorganic filler as those in Example 21, but used a plasticizer in a reduced amount. In this example, a viscosity at a low shear speed [was] *is* slightly higher than the upper limit of the most preferable range, but [was] *is* within an adequately preferable range, giving good results.

Discussion on Examples 27 and 28

Example 27 used the same fine particle of polymer and inorganic filler as those in Example 23, but a plasticizer [was] *is* considerably increased to 180 wt parts. In this case, a viscosity at a low shear speed [was] *is* within the optimum range, but a viscosity at a high shear speed [was] *is* outside of a preferable range. It led to increase in dispersion of the plastisol in an airless spray and thus inferior suitability to an airless spray. It, however, meets the specific surface area condition required in this invention so that it may be satisfactorily used in a processing method other than an airless spray.

Example 28 used the same fine particle of polymer and inorganic filler as those in Example 21, but a blending ratio of the inorganic filler [was] *is* modified, i.e., the inorganic filler with an average particle size of 2 μm or less [was] *is* contained only to 25 wt % in the whole inorganic fillers. A viscosity at a low shear speed was, therefore, within a preferable range in this invention while a viscosity at a high shear speed [was] *is* outside of a preferable range. It [was] *is* thus difficult to atomize a plastisol composition and to conduct airless spraying. However, it still meets the condition for a specific surface area required in this invention so that it may be suitably used in a processing method other than airless spraying.

Discussion on Examples 29 and 30

Example 29 used the same fine particle of polymer as Example 21, but used an inorganic filler with an average particle size of 4.44 μm alone. In this example, a viscosity at a high shear speed [was] *is* within a preferable range, but a viscosity at a low shear speed [was] *is* so low that it exhibited slightly inferior antisagging property and a slightly disturbed coating-film pattern. It, however, meets the specific surface area condition required in this invention so that it may be satisfactorily used in a processing method other than an airless spray.

Example 30 used the same fine particle of polymer and inorganic filler as Example 21, but the amount of a plasticizer [was] *is* reduced to 120 wt parts. In this example, both viscosity values at low and high shear speeds [were] *are* outside of preferable ranges so that airless spraying could not be conducted. It, however, meets the specific surface area condition required in this invention so that it may be satisfactorily used in a processing method other than an airless spray.

Discussion on Examples 31 and 32

Examples 31 and 32 used the same filler as Example 20 and reduced the primary particle size of the fine particle of polymer. In both examples, the primary particle size of the fine particle of polymer [was] *is* outside of a preferable range (500 nm or more), leading to a very high viscosity at a low shear speed. In particular, the primary particle size of the fine particle of polymer [was] *is* extremely small in Example 32 so that a viscosity at a high shear speed became too high to conduct airless spraying. They, however, meet the specific surface area condition required in this invention so that they may be satisfactorily used in a processing method other than an airless spray.

Discussion on Examples 33, 34 and 35

Example 33 used the same fine particle of polymer (A12) as Example 20 and Examples 34 and 35 used a fine particle of polymer containing an epoxy group (A18) and an acetacetyl group (A17), respectively. Furthermore, in these examples, blending conditions for a block isocyanate and polyamide-polyamine as adhesion aids [were] *are* modified. For an inorganic filler, the same conditions as Example 20 [were] *are* used. In Example 33 or 34, either a block isocyanate or polyamide-polyamine [was] *is* blended so that improved adhesiveness [was] *is* achieved by bonding between the functional group in a fine particle of polymer and the functional group on a cation electrodeposition plate. In Example 35, either a block isocyanate or polyamide-polyamine [was] *is* not blended so that adhesiveness [was] *is* slightly lower than Examples 33 and 34, but the functional group in the polymer contributed to provide adequate adhesiveness.

What is claimed is:

1. A non-halogenated plastisol composition comprising:

i) a fine particle of polymer for a plastisol free from halogen atoms and having a specific surface area of 0.6 to [20.0] *10* $m^2/g$ as determined by nitrogen-gas adsorption and an oil absorption rate [by linseed oil] of 0.8 mL/g or less *for linseed oil*; and ii) a plasticizer, wherein said fine particle is of at least one polymer selected from the group consisting of acrylic polymers, acrylic copolymers, styrene polymers, styrene copolymers, butadiene polymers, butadiene copolymers, vinyl-acetate polymers, vinyl-acetate copolymers and a mixture thereof,

*said fine particle contains at least 50 mol % of an alkyl (meth)acrylate unit,*

*the fine particle of polymer has two or more polymer layers having different compositions concentrically from the particle center to its surface,*

*and compatibility of a polymer to a plasticizer in an inner layer close to the center is higher than that in an outer layer close to a particle surface.*

[2. The non-halogenated plastisol composition of claim 1 wherein the fine particle of polymer has two or more polymer layers having different compositions concentrically from the particle center to its surface.]

3. The non-halogenated plastisol composition of claim 1, wherein said fine particle of polymer is in the form of agglomerates formed from a plurality of primary particles wherein the primary particles have an average particle size of at least 500 nm.

4. A process for manufacturing [a] *the* non-halogenated plastisol composition *of claim 1* comprising the steps of:

preparing an aqueous dispersion of a fine particle of polymer in which primary particles have an average particle size of at least 500 nm;

drying the aqueous dispersion at not lower than 50° C. but not higher than a glass-transition temperature of the polymer +20° C., by spray drying; and blending with a plasticizer.

5. The non-halogenated plastisol composition of claim 1, further comprising an inorganic filler.

6. The non-halogenated plastisol composition as claimed in claim 5 wherein viscosity values at shear speeds of 10000 $sec^{-1}$ and 0.42 $sec^{-1}$ are 0.1 to 1.0 Pa·s (25° C.) and 100 to 1000 Pa·s (25° C.), respectively.

7. The non-halogenated plastisol composition as claimed in claim 6 wherein the inorganic filler essentially consists of inorganic fillers with an average particle size of less than 2.0 μm (C1) and of 2.0 μm or more (C2) and a component, ratio of these inorganic fillers (C1) to (C2) (by weight) is 30/70 to 70/30.

8. The non-halogenated plastisol composition of claim 1, wherein the plasticizer comprises a phthalic acid diester of an aliphatic alcohol having 7 to 10 carbon atoms in at least 50 wt %.

9. An article produced using the plastisol composition as claimed in any of claims 5 to 8.

10. The non-halogenated plastisol composition of claim 1, wherein said polymer is an acrylic polymer.

11. The non-halogenated plastisol composition of claim 1, wherein said polymer is at least one copolymer selected from the group consisting of styrene-butadiene copolymer, acrylonitrile-butadiene copolymers and acryl-vinyl acetate copolymers.

12. A method of coating comprising applying the non-halogenated plastisol composition of claim 1; and curing.

13. A method of sealing comprising applying the non-halogenated plastisol composition of claim 1; and curing.

14. A method of undercoating an automobile comprising applying the non-halogenated plastisol composition of claim 1 to a surface of an automobile; and curing.

15. The method of coating of claim 12, wherein said curing is by heating.

16. The method of sealing of claim 13, wherein said curing is by heating.

* * * * *